2,850,474

PROCESS OF CURING POLYURETHANES USING A POLYISOCYANATE AND A METHYLOL MELAMINE

Frank S. Maxey, Akron, Ohio, assignor to The Goodyear Tire & Rubber Company, Akron, Ohio, a corporation of Ohio No Drawing. Application February 1, 1955
Serial No. 485,578

2 Claims. (Cl. 260—45.3)

This invention relates broadly to synthetic polymers. More particularly, it relates to improved methods for molding and curing elastomeric diisocyanate-modified polyesters and polyesteramides. It also relates to improved cured compositions obtained by the improved methods of molding and curing.

New types of synthetic polymers formed from diisocyanates and polyesters or polyesteramides have recently been described in U. S. Patents 2,625,531, 2,625,532 and 2,625,535. These synthetic rubbers, as well as those described in patent applications Serial No. 305,914, filed August 22, 1952 now United States Patent 2,777,831, and Serial No. 307,900, filed September 4, 1952 now United States Patent 2,760,953, are prepared by reacting polyesters or polyesteramides of controlled molecular weight and designated chemical composition with controlled amounts of particular diisocyanates to form unvulcanized synthetic polymers having the physical characteristics of unvulcanized natural rubber. These unvulcanized synthetic polymers, optionally compounded with plasticizers, fillers, coloring agents, anti-oxidants or other conventional compounding ingredients, are mixed with a polyisocyanate which functions as a cross-linking or curing agent for the unvulcanized polymer. After the compounding ingredients and curing agent have been added to the unvulcanized polymer, the material may be processed in the same manner that natural rubber compounds are processed.

It has been observed that when these compounded synthetic polymers are molded and cured at elevated temperatures they can be removed from hot molding surfaces after the cure has been completed only with difficulty since the cured material adheres to the hot mold surfaces. The mold treatments commonly used in the curing of natural or other synthetic rubbers have not been found to be satisfactory for eliminating this difficulty in the handling of these elastomeric diisocyanate-modified polyesters. It is possible to reduce the tendency of these polymers to stick to the mold surface by cooling the mold surface before removing the cured article, but this procedure reduces the productive time for the mold and the curing press and also requires the use of additional heat to return the cooled mold to curing temperatures. It has also been observed that the cured polymers contain blisters and bubbles when removed from a hot mold.

It is, therefore, an object of this invention to provide a curing system for unvulcanized elastomeric diisocyanate-modified polyesters which eliminates the necessity of reducing the molding temperature of the molding surface before the cured article can be easily removed. Another object is to permit the removal of cured isocyanate-modified polyesters from the curing mold in a manner whereby the cured material does not stick to the molding surface. Another object is to increase the effective production time of equipment used to cure unvulcanized elastomeric diisocyanate-modified polyesters. Another object is to achieve the objects indicated above without requiring a treatment of the mold surface. Still another object is to eliminate blisters and bubbles from the cured polymer when it is removed from a hot mold. Other objects will appear as the description proceeds.

The objects of this invention are accomplished by incorporating into the uncured polymer an alkyl ether of methylol melamine. These compounds, also described as alkylated methylol melamines, are prepared by reacting from 2 to 6 mols of formaldehyde with 1 mol of melamine to form the methylol melamine which is then reacted with an alcohol such as methyl alcohol, ethyl alcohol, propyl alcohol, isopropyl alcohol, butyl alcohol, isobutyl alcohol and amyl alcohol. Depending upon the molecular ratio of formaldehyde to melamine the nitrogen atoms in the melamine nucleus can be substituted from 2 to 6 times by an alkyl ether of methylol. While the di-, tri-, tetra- and penta-substituted derivatives are equally effective in the practice of this invention, the hexa-substituted derivatives and particularly the hexamethyl ether of hexamethylol melamine are preferred. Further description of the alkyl ethers of methylol melamine and methods for their preparation will be found in Reissue Patent 22,566 issued November 21, 1944.

It has been observed that by employing from 0.5 to 5 parts by weight of the alkylated methylol melamine per 100 parts by weight of the uncured polymer, it is possible to remove a blister-free, bubble-free cured article from a hot mold without having the cured polymer stick to the mold. It is preferred to use approximately 3 parts by weight of the alkylated methylol melamine per 100 parts by weight of the uncured polymer.

The following examples, in which parts are shown by weight, illustrate the practice of this invention:

|  | Example 1 | Example 2 |
| --- | --- | --- |
| Uncured polymer | 100.00 | 100.00 |
| Carnauba wax | 2.00 | 2.00 |
| Polyisocyanate | 6.50 | 6.50 |
| Vulcafor VHM |  | 3.00 |

The uncured polymer used was the reaction product of 8.36 parts by weight of 2,4-tolylene diisocyanate and 100 parts by weight of a polyester prepared from 80 mol percent ethylene glycol, 20 mol percent propylene glycol and adipic acid. The polyester had an acid number of 2.2 and a hydroxyl number of 53.5. The polyisocyanate employed was a mixture of polyisocyanates prepared by phosgenating a polyamine mixture formed from aniline and formaldehyde. Polyisocyanate mixtures of this type and methods for their preparation are described in United States Patent 2,683,730. Vulcafor VHM is the hexamethyl ether of hexamethylol melamine.

The compounding ingredients were blended with the uncured polymer on a rubber mill in accordance with conventional procedures. Sheets of each compound were placed in steel molds and cured in a press for 15 minutes at 280° F. The cured sheets of Example 1 stuck to the hot molds after the cure was completed and contained blisters. The sheets of Example 2 were easily removed from the hot mold and contained no blisters. Tests run on the cured sheets showed a tensile strength of 3950 pounds per square inch and an elongation of 640% for Example 2 while the sheets prepared according to Example 1 were unsuitable for testing.

In addition to the specific materials shown in Example 2, other alkyl ethers of methylol melamine may be employed, such as the ethyl, propyl, isopropyl, butyl, isobutyl or amyl ethers of methylol melamine. The practice of this invention is generally applicable to the improvement of the physical properties of diisocyanate-modified polyesters which are cured by means of polyisocyanate and to improvements in the methods of making the same.

While certain representative embodiments and details have been shown for the purpose of illustrating the invention, it will be apparent to those skilled in this art that various changes and modifications may be made therein without departing from the spirit or scope of the invention.

I claim:

1. In the method of curing elastomeric organic diisocyanate modified polyesters by means of an organic polyisocyanate, said polyesters being prepared from the condensation reaction between a dicarboxylic acid and a glycol, the improvement which comprises conducting said cure in the presence of from 0.5 to 5 parts by weight of an alkyl ether of methylol melamine per 100 parts by weight of said elastomeric organic diisocyanate modified polyester, the alkyl radical containing from 1 to 5 carbon atoms.

2. In the method of curing elastomeric organic diisocyanate modified polyesters by means of an organic polyisocyanate, said polyesters being prepared from the condensation reaction between a dicarboxylic acid and a glycol, the improvement which comprises conducting said cure in the presence of approximately 3 parts by weight of an alkyl ether of methylol melamine per 100 parts by weight of said elastomeric organic diisocyanate modified polyester, the alkyl radical containing from 1 to 5 carbon atoms.

References Cited in the file of this patent

UNITED STATES PATENTS

| | | |
|---|---|---|
| 2,432,148 | Furness et al. | Dec. 9, 1947 |
| 2,625,535 | Mastin et al. | Jan. 13, 1953 |